United States Patent [19]

Hahn et al.

[11] Patent Number: 4,507,071
[45] Date of Patent: Mar. 26, 1985

[54] COEXTRUSION APPARATUS FOR PRODUCING MULTIPLE LAYERED THERMOPLASTIC PIPE

[75] Inventors: Granville J. Hahn; Raleigh N. Rutledge; Jackie D. Murley, all of Big Spring, Tex.

[73] Assignee: Cosden Technology, Inc., Dallas, Tex.

[21] Appl. No.: 493,907

[22] Filed: May 12, 1983

[51] Int. Cl.³ .............................................. B29D 23/04
[52] U.S. Cl. ................................. 425/133.1; 264/173; 264/209.8; 425/376 A; 425/462; 425/467
[58] Field of Search ................. 425/133.1, 131.1, 462, 425/467, 376 A; 264/173, 209.8

[56] References Cited

U.S. PATENT DOCUMENTS

| | | | |
|---|---|---|---|
| 2,859,476 | 11/1958 | Lainson | 425/462 |
| 2,973,783 | 3/1961 | Boe | 264/209.2 |
| 3,899,276 | 8/1975 | Sokolow | 425/467 |
| 4,061,461 | 12/1977 | Hessenthaler | 264/173 |
| 4,125,585 | 11/1978 | Rosenbaum | 264/173 |
| 4,134,952 | 1/1979 | Yoshikawa et al. | 425/133.1 |
| 4,208,175 | 6/1980 | Rosenbaum | 425/131.1 |
| 4,236,953 | 12/1980 | Takahashi | 264/514 |
| 4,249,875 | 2/1981 | Hart et al. | 425/133.1 |
| 4,344,907 | 8/1982 | Herrington | 425/462 |
| 4,364,882 | 12/1982 | Doucet | 264/209.8 |
| 4,402,898 | 9/1983 | Rosenbaum | 425/467 |

FOREIGN PATENT DOCUMENTS

| | | | |
|---|---|---|---|
| 2718537 | 11/1977 | Fed. Rep. of Germany | 425/133.1 |
| 2821333 | 11/1978 | Fed. Rep. of Germany | 264/173 |
| 49-8029 | 2/1974 | Japan | 425/133.1 |

Primary Examiner—Jeffery Thurlow
Attorney, Agent, or Firm—Robert H. Sproule; Roy L. Van Winkle

[57] ABSTRACT

An apparatus for the formation of a multiple layered pipe comprising a die housing having a bore therethrough with a mandrel longitudinally supported within the bore by a spider to provide an annular extrusion passageway defined by the inside surface of the housing and the outer surface of the mandrel. The mandrel comprises a series of sequentially positioned annular feed rings for the laydown of thermoplastic material on the inner surface of the main thermoplastic material flowing thereover through the extrusion passageway. The extrusion passageway is constricted downstream of the spider but prior to the annular sequentially positioned feed rings to reunite the thermoplastic material after the flow disruption created by the spider. Also included in the mandrel is a longitudinal passageway in communication with the inlet section of the bore for the transportation of thermoplastic material therethrough to one or more of the annular feed rings. The mouth of the mandrel bore includes a restrictor orifice therein to balance the pressure differential created therein by the constriction in the extrusion passageway.

7 Claims, 10 Drawing Figures

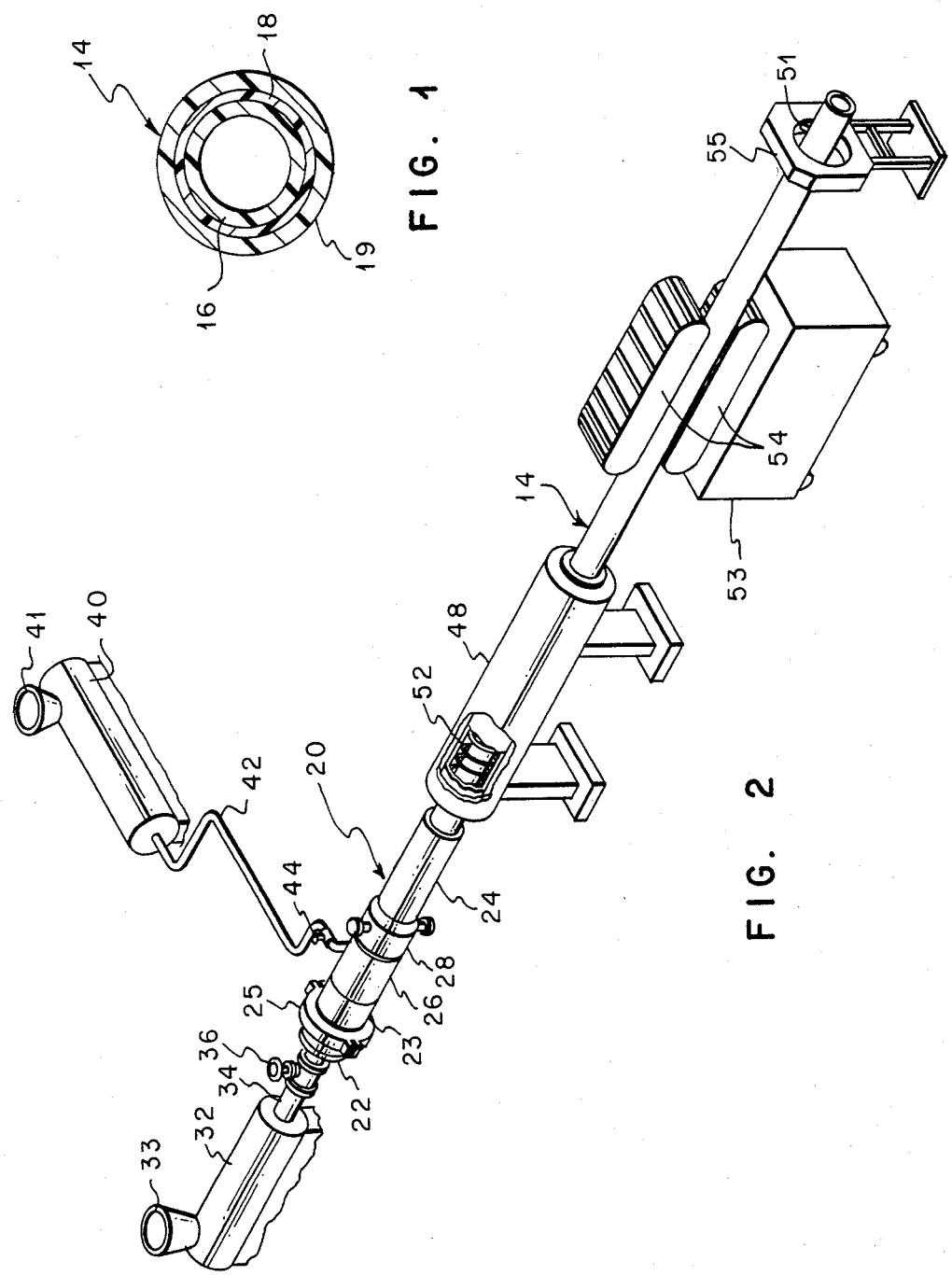

COEXTRUSION APPARATUS FOR PRODUCING MULTIPLE LAYERED THERMOPLASTIC PIPE

BACKGROUND OF THE INVENTION

The present invention relates to an apparatus for producing multiple layered pipe, preferably of two or more thermoplastic resins, and preferably having three layers comprising at least one outer layer, an intermediate film layer, and at least one inner layer.

Many attempts have been made to produce a multiple layered pipe in order to combine the desirable characteristics of different thermoplastic resins. These attempts have usually involved extruding several streams of thermoplastic resins through a series of concentric tubes which are fixed relative to one another in a radial manner, such as by spiders, to define annular passages therebetween, and then subsequently joining the resultant annular layers to produce a multiple layered pipe. Pipes prepared by such processes and apparatus, however, have had spider marks thereon due to the flow interruptions caused by the many spiders necessitated in such apparatus. Moreover, such apparatus contain adjusting screws which protrude into the individual die passages for adjusting the thickness of the annular layers. These screws also interfere with the flow of the molten resin as it is being extruded causing additional marks on the pipe.

Furthermore, it is undesirable to provide an extrusion die for each layer of the desired pipe. Since high internal pressure is required for the extrusion of the highly viscous heat plastified thermoplastic material, such apparatus are subject to distortions in the die which cause undesirable nonuniformity in the thickness of each layer, unless the extrusion pressures of each layer are balanced. However, in practice, it is frequently difficult to maintain extrusion pressures constant in their proper relationship. Those types of apparatus employing a separate die for each layer thus inherently involve difficulty in controlling the thickness of each layer in the desired pipe.

Another disadvantage associated with other apparatus for the production of co-extruded plastic pipe is the inability of these apparatus to equalize the flow of thermoplastic within the die so that the heat plastified thermoplastic is applied as a continuous layer of constant thickness. This problem is particularly prevalent in those apparatus in which layers of thermoplastic are extruded through radial orifices. In order to form a layer of constant thickness, it is absolutely essential in such apparatus that the flow of thermoplastic through the orifice is constant along its entire circumference.

In the extrusion of multiple layered pipe having an intermediate thin film layer of thermoplastic material, it is necessary at the point of laydown that the layers of thermoplastic material have viscosity indexes similar to that of the film layer. Any significant difference in viscosity will prevent bonding of the outer and inner layers to the film. In addition to controlling the relative viscosities, it is also necessary that each layer have a constant thickness. Failure to achieve very precise viscosity control and uniformity of thickness of each layer in pipe having one or more thin film layers, results in a product which has inferior physical properties.

U.S. Pat. No. 4,249,875 by Hart et al disclosed a process and apparatus for producing multiple layered pipe utilizing a single annular die passage to laydown multiple inner and/or outer layers of thermoplastic onto a main stream of thermoplastic. An extrusion passage of suitable length was utilized to allow the bonded thermoplastic to reunite from the interruptions caused by the radial support legs of the mandrel positioned in the extrusion passage. This reuniting of the thermoplastic occurred at the same time as the laydown of the inner and outer layers, resulted in some lack of uniformity in layer thickness. In addition, the Hart patent disclosed separate extruders to supply thermoplastic material to the inner and outer layers respectively. The use of separate extruders made it difficult to control the relative viscosities of the inner and outer layers because of the difficulty of operating both extruders at the same temperature.

It would be desirable, therefore, if an apparatus for the production of multiple layered pipe having an intermediate film layer was available which could attain very precise control of both the layer thickness and viscosity of the thermoplastic throughout the narrow extrusion passages of the die.

SUMMARY OF THE INVENTION

In accordance with the present invention there is provided a balanced flow die apparatus for producing multiple layered thermoplastic pipe. The apparatus comprises a housing including a bore therethrough and a mandrel supported within the bore and defining therein an annular main extrusion passageway for transporting an annular stream of a first thermoplastic material. A portion of the main extrusion passageway is annularly constricted therein. The mandrel includes a coextrusion passageway for transporting a stream of the first thermoplastic material therethrough, a portion of the coextrusion passageway being annularly constricted therein to balance the pressure differential therein created by the main extrusion passageway constriction.

Also included in the invention is a first and a second laydown means. The first laydown means is for applying a stream of a second thermoplastic material to the inner surface of the annular stream of the first thermoplastic material flowing thereover. The first laydown means is positioned within the bore downstream of the main extrusion annular constriction and is circumscribed by the main extrusion passageway. The first laydown means includes an annular feed ring and an annular radial orifice connecting the feed ring to the main extrusion passageway to direct the flow of the second thermoplastic material thereto.

The second laydown means is for applying a stream of the first thermoplastic material to the inside surface of the annular stream of the second thermoplastic material flowing thereover. The second laydown means is positioned within the bore downstream of the first laydown means and is circumscribed by the main extrusion passageway. The second laydown means is in communication with the first coextrusion passageway and includes therein an annular feed ring and an annular radial orifice connecting the feed ring to the main extrusion passageway to direct the flow of the first thermoplastic material thereto.

The die apparatus may additionally comprise at least one additional laydown means positioned within the bore downstream of the second laydown means and circumscribed by the main extrusion passageway for applying an additional stream of thermoplastic material to the inside surface of the thermoplastic stream flowing thereover.

Another embodiment of the present invention comprises a balanced flow die apparatus for producing a multiple layered thermoplastic pipe. This embodiment comprises a main housing including a bore therethrough, and a mandrel supported within the bore and defining therein an annular main extrusion passageway for transporting an annular stream of a first thermoplastic material therethrough. A portion of the main extrusion passageway is annularly constricted therein. The mandrel includes a coextrusion passageway for transporting a stream of the first thermoplastic material therethrough, a portion of the coextrusion passageway being annularly constricted therein to balance the pressure differential therein created by the main extrusion passageway constriction.

Also included in this embodiment is a plurality of laydown means including a first laydown means for applying a stream of defined material to the inner surface of the annular stream of the first thermoplastic material flowing thereover. The first laydown means is positioned within the bore downstream of the main extrusion annular constriction and is circumscribed by the main extrusion passageway. The first laydown means includes an annular feed ring and an annular radial orifice connecting the feed ring to the main extrusion passageway to direct the flow of the defined material thereto.

A second laydown means is used for applying a stream of a second thermoplastic material to the inner surface of the annular stream of the defined material flowing thereover. The second laydown means is positioned within the bore downstream of the first laydown means and is circumscribed by the main extrusion passageway. The second laydown means includes an annular feed ring and an annular radial orifice connecting the feed ring to the main extrusion passageway to direct the flow of the second thermoplastic material thereto.

Also included in this embodiment is a third laydown means for applying a stream of the defined material to the inner surface of the annular stream of the second thermoplastic material flowing thereover. The third laydown means is positioned within the bore downstream of the second laydown means and is circumscribed by the main extrusion passageway. The third laydown means is in communication with the first laydown means to receive the defined material therefrom. The third laydown means includes an annular feed ring and an annular radial orifice connecting the feed ring to the main extrusion passageway to direct the flow of the defined material thereto.

A fourth laydown means is used for applying a stream of the first thermoplastic material to the inside surface of the annular stream of the defined material flowing thereover. The fourth laydown means is positioned within the bore downstream of the third laydown means and is circumscribed by the main extrusion passageway. The fourth laydown means is in communication with the first coextrusion passageway to receive the first thermoplastic material therefrom. The fourth laydown means includes an annular feed ring and an annular radial orifice connecting the feed ring to the main extrusion passageway to direct the flow of the second thermoplastic material thereto.

In a separate embodiment, the die apparatus may also comprise at least one additional laydown means positioned within the bore downstream of the fourth laydown means and circumscribed by the main extrusion passageway for applying an additional stream of the defined material to the inside surface of the thermoplastic stream flowing thereover.

In another embodiment of the present invention, the defined material is adhesive.

In a separate embodiment of the present invention, the defined material is thermoplastic.

Various other features and attendent advantages of this invention will be more fully appreciated from the following detailed description of preferred embodiments when considered in connection with the accompanying drawings.

BRIEF DESCRIPTION OF THE DRAWINGS

FIG. 1 is an axial sectional view of a three layer pipe;

FIG. 2 is a perspective view of one embodiment of the present invention showing the attachment of the main extruder, coextruder, vacuum sizer, pulling means and rotary scanner in relation to a coextrusion die adapted for the formation of a three layer pipe;

DETAILED DESCRIPTION OF THE PREFERRED EMBODIMENTS

Figure 3:
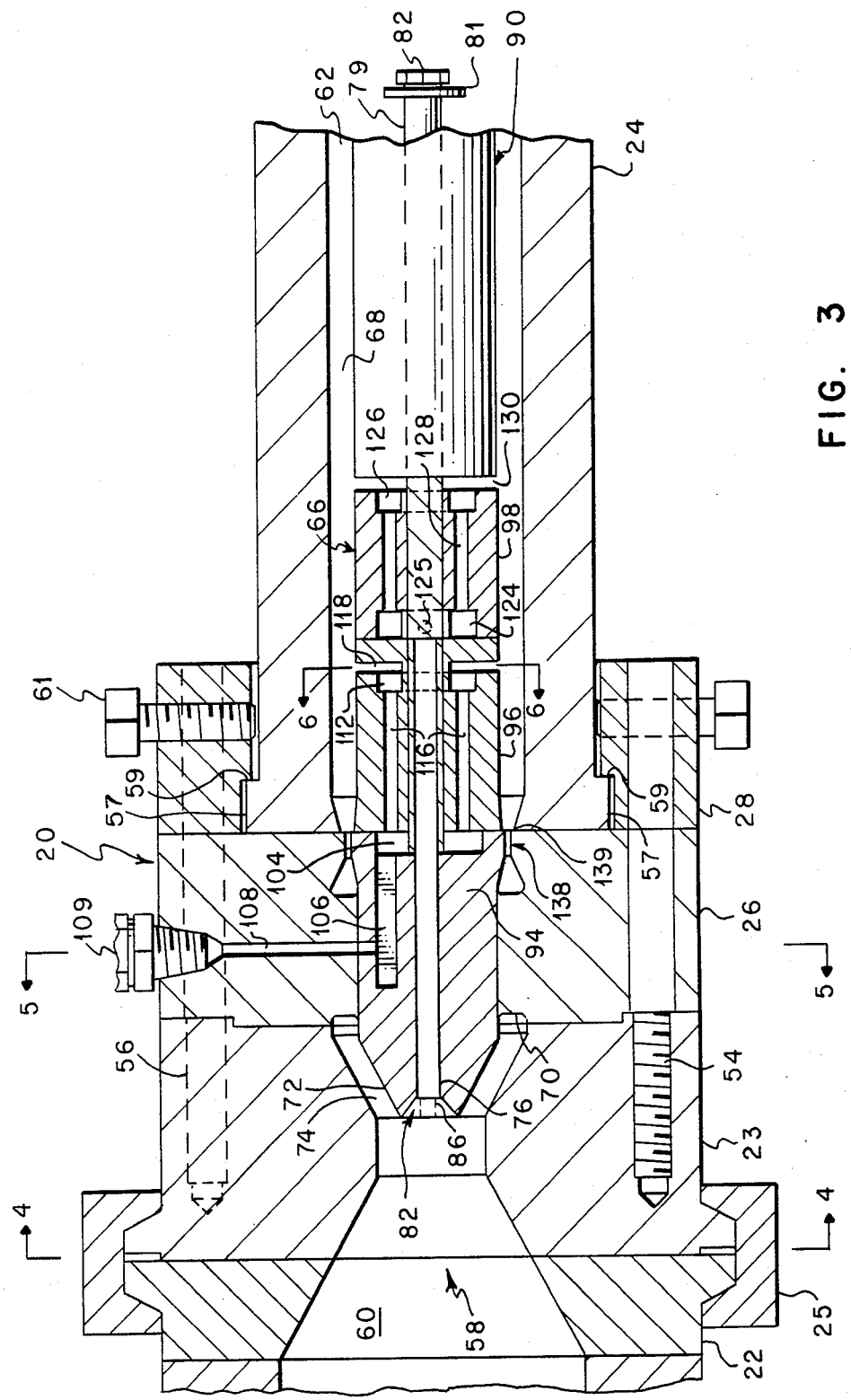
FIG. 3 is a enlarged longitudinal section through the die apparatus of FIG. 2.

Referring now to the drawings; FIG. 1 illustrates one embodiment of the present invention comprising a three layered thermoplastic pipe. The pipe indicated at 14 has three layers, a barrier film middle layer 18 having a thickness from about 5 to about 10 mils, an inner layer 16 having a thickness greater than about 20 mils, and an outer layer 19 having a thickness greater than about 20 mils. It should be appreciated that the thicknesses of the outer layer 19 and inner layer 16 will depend on the desired total wall thickness of the pipe.

The pipe 14 is produced by the apparatus illustrated in FIG. 2. The die apparatus indicated at 20 includes an annular transition body 22 and an annular discharge sleeve 24. Interposed between sections 22 and 24 is an annular die inlet body 23 positioned adjacent to and downstream of transition body 22; an annular spider body 26 positioned adjacent to and downstream of die inlet body 23, and an annular sleeve adjustment body 28 positioned adjacent to and downstream of spider body 26. Transition body 22 is connected to inlet body 23 by connector ring 25. A main extruder 32, including feed hopper 33 is connected to die apparatus 20 at transition body 22 by feed conduit 34. Control valve 36 is used to adjust the rate of feed of material through conduit 34. A coextruder 40 including feed hopper 41 is connected to die apparatus 20 at spider body 26 by feed conduit 42. Control valve 44 regulates the rate of flow through conduit 42. A heat exchanger (not shown) may be positioned between main extruder 32 and die apparatus 20 in communication with feed conduit 34 to obtain more precise control over the temperature of the material exiting from main extruder 32.

Also shown in FIG. 2 is a vacuum sizer 48 which preferably is utilized in conjunction with the die apparatus of the present invention to control the diameter of the pipe 14. The vacuum sizer 48 is constructed to contain in approximately the first half of its length, a sizing die 52 in which the extruded pipe 14 passes immediately after its exit from discharge sleeve 24 through discharge passage 62 (FIG. 3). The sizing die 52 functions to adjust the extruded pipe to its finished size. The latter half of the vacuum sizer 48 is constituted by a cooling chamber, not shown, also maintained under vacuum. In this chamber, the final extruded and now sized pipe is cooled as nearly as possible to ambient temperature in order to further solidify the thermoplastic materials of each of the layers of the pipe 14. Cooling is suitably achieved by contacting the extruded article with a fine spray of cooling water. Alternatively, cooling may be achieved by immersing the pipe 14 in a water bath.

Downstream of the vacuum sizer 48 is a pipe pulling means 53 for pulling the pipe 14 from the sleeve 24 through the vacuum sizer 48 and along the apparatus line. Pipe pulling means 53 may comprise a pair of opposing rotary treads 54 which engage the pipe 14 therebetween to impart horizontal movement to it. The rotational velocity of treads 54 may be adjusted to increase the horizontal travel of pipe 14 forming in discharge sleeve 24, thereby causing the pipe 14 to stretch axially between die apparatus 20 and vacuum sizer 48, and also reducing the wall thickness of pipe 14 about 12 to 15%. This linear stretching, which decreases the wall thickness of pipe 14, prepares the pipe for entry into vacuum sizer 48.

Downstream of pipe pulling means 53 is a rotary scanner 55 such as the one manufactured by NDC Systems utilizing probe 51 which rotates 360° about the surface of pipe 14 to continuously display and record the wall thickness of pipe 14.

Referring now to FIG. 3 which illustrates a longitudinal cross-section of die body 20, there is a transition die body 22 at the left end thereof and a discharge sleeve 24 at the right end. Interposed between die sections 22 and 24 are inlet body 23, spider body 26, and sleeve adjustment body 28 held together in end-to-end relationship by bolts 54 engaged in threaded holes 56. Discharge sleeve 24, concentrically positioned within sleeve adjustment body 28, includes an annular ridge 57 about the circumference thereof which is engaged by annular lip 59 of sleeve adjustment body 28 to hold the discharge sleeve 24 against spider body 26. The outer diameter of discharge sleeve 24 is smaller than the inside diameter of sleeve adjustment body 28 to allow sleeve 24 from about 5 mils to about 7 mils radial movement therein. Circumferentially positioned about sleeve adjustment body 28 are a plurality of sleeve adjusting bolts 61 located to radially align sleeve 24 within adjustment body 28.

Longitudinally traversing through die body 20 is a die bore indicated at 58 including an inlet passageway 60 at the left end of die apparatus 20 and outlet passageway 62 at the right end thereof. A mandrel indicated at 66 is longitudinally disposed inside bore 58 to define an annular extrusion passageway 68 formed between the outer surface of mandrel 66 and the inner surface of die apparatus 20. The mandrel 66 is equidistantly supported within bore 58 by spider legs 70 radially extending from the inner surface of spider body 66 into bore 58. Mandrel 66 includes a conical nose 72 positioned in close proximity to inlet 60 of bore 58. Inlet 60 is in direct communication with main extruder feed line 34. Inlet 60 narrows prior to conical nose 72 to provide a transition zone from the larger main extruder discharge line 34. Around conical nose 72, inlet 60 diverges in spaced relationship to conical nose 72, thereby defining an extrusion inlet passageway 74.

Figure 4:
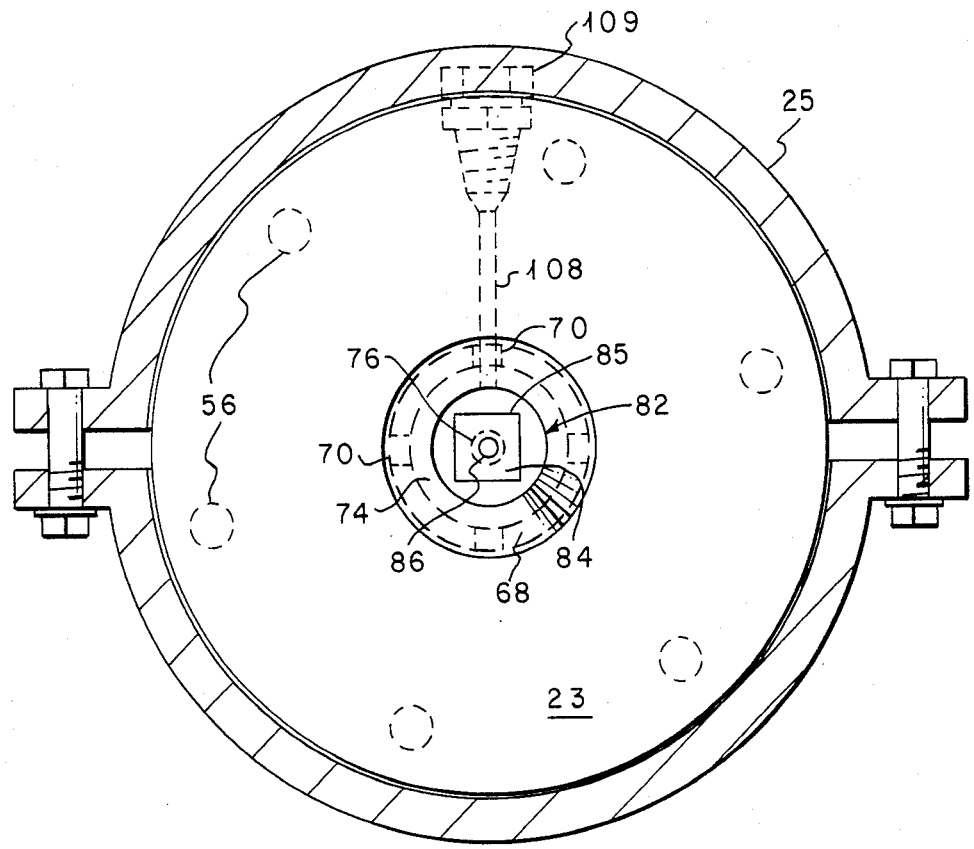
FIG. 4 is an axial sectional view along the left end face of the die inlet body and mandrel cone section taken on a line 4—4 of FIG. 3.

Also included in mandrel 66 is a central feed passage 76 axially disposed therein and in direct communication with inlet 60 through the tip of conical nose 72. Conical nose 72 (further illustrated in FIG. 4) includes a central feed passage restrictor 82 comprising a threaded plug 84 and a constrictor orifice 86 extending therethrough, communicating feed passage 76 with inlet 60. Threaded plug 84 includes square receptacle 85 for the receipt of an Allen wrench for removal of plug 84 and replacement by other plugs having orifices of different diameters.

Referring again to FIG. 3, mandrel 66 includes at the right end thereof, positioned within die discharge sleeve 24, a cylindrically-shaped mandrel discharge section 90. Positioned between conical nose 72 and discharge section 90 are spider section 94, first laydown section 96 and second laydown section 98 which are joined in end-to-end relationship by a bolt 79 axially centrally disposed therethrough. Washer 81 and nut 82 at the discharge end of discharge section 90 secure the mandrel sections on bolt 79. The discharge portion 62 of extrusion passageway 68 as defined by discharge sleeve 24 and discharge section 90 determines both the total wall thickness of the thermoplastic pipe and its diameter. Therefore both sleeve 24 and discharge section 90 are removable when requirements dictate a pipe having a different wall thickness and/or diameter. Central feed passageway 76 is axially disposed within bolt 79 through laydown sections 96, 98, and discharge section 90.

Figure 5:
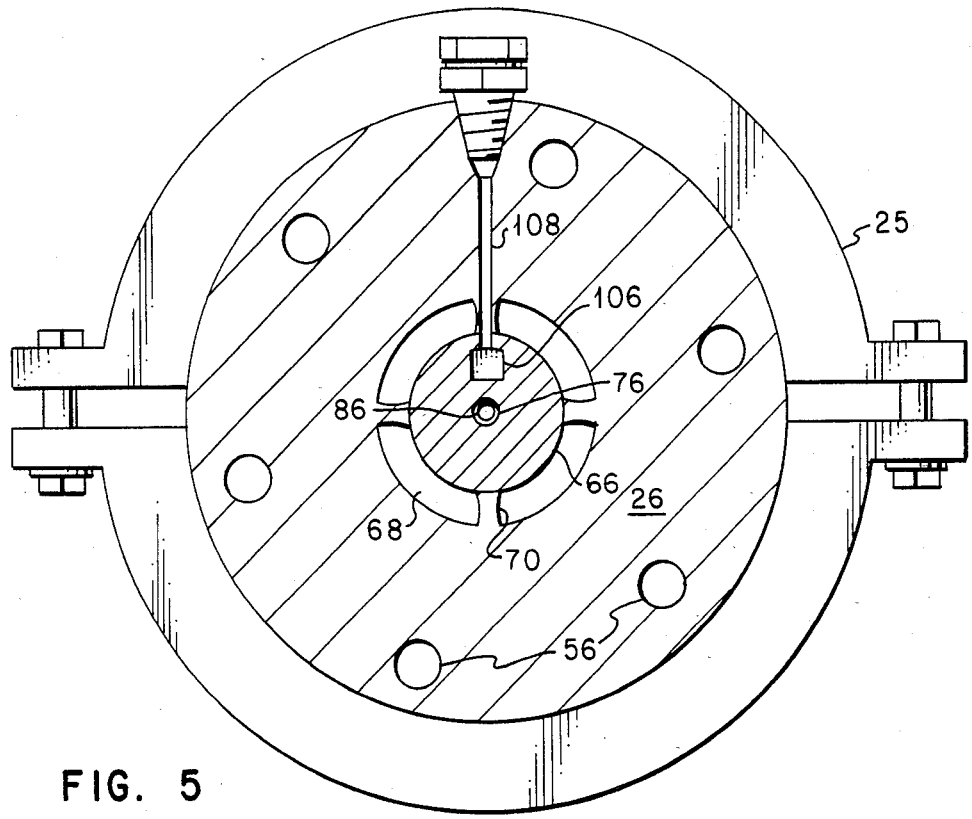
FIG. 5 is an axial sectional view taken through the spider body and mandrel spider section taken on a line 5—5 of FIG. 3.

Spider section 94, in addition to feed passage 76 extending therethrough, includes a longitudinal feed passage 106 comprising a slotted passage (see FIG. 5) longitudinally extending through spider section 94 and terminating in a reservoir chamber 104 milled into the right end face of spider section 94 and annularly disposed about bolt 79. In direct communication with longitudinal feed passage 106 is inlet passage 108 passing vertically through spider body 26 and spider leg 70 and in direct communication with feed conduit 42 through feed connector 109 for the transport of feed from coextruder 40 to die 20.

Figure 6:
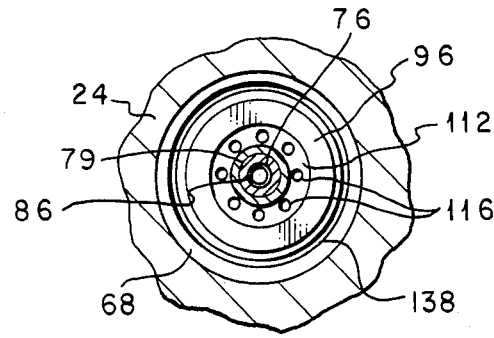
FIG. 6 is a partial axial sectional view taken along the right end face of the mandrel first laydown section taken on a line 6—6 of FIG. 3.

Abutting spider section 94 in a direct end-to-end relationship downstream thereof is first laydown section 96. First laydown section 96 includes annular chamber 112 milled into the right end face thereof and annularly disposed about bolt 79. Also included therein are individual feed equalizer ports 116 (see FIG. 6) located parallel to bolt 79 and circumferentially disposed about bolt 79 in direct communication with annular reservoir chamber 104. Also milled into the right end face of first laydown section 96 and further defined by the left end face of second laydown section 98 is annular distribution orifice 118 annularly disposed within first laydown section 96 and providing a restricted passageway between annular feed chamber 112 and extrusion passage 68 to insure a uniform circumferential laydown of thermoplastic material.

Located downstream of the first laydown section 96 directly adjacent thereto in end-to-end relationship is second laydown section 98. Included in second laydown section 98 is annular reservoir chamber 124 comprising an annular space milled therein in direct communication with central passageway 76 via a plurality of radial distribution holes 125 formed through bolt 79. At the right end face of second laydown section 98 is annular feed chamber 126 milled therein and in communication with annular reservoir chamber 124 through equalizer ports 128. Also milled into the right end face of second laydown section 98 and further defined by the left end face of discharge section 24 is annular distribution or "laydown" orifice 130 connecting annular feed chamber 126 with extrusion passageway 68.

An important part of the apparatus is the constriction 138 of extrusion passageway 68 located between spider legs 70 and the first laydown restrictor orifice 118. As shown in FIG. 3, extrusion passageway constriction 138 is formed by the convergence of the side walls of mandrel 66 and spider section 94. The purpose of the extrusion passageway constriction 138 is two-fold, (1) to reunite the thermoplastic material in extrusion passage 68 after it has been separated by the radial spider legs 70, and (2) to relieve the back pressure in main extrusion passageway 68 downstream of laydown orifice 130 to allow easier and more precise radial adjustment of discharge sleeve 24. The diverging portion 139 of constriction 138 formed by laydown section 96 and discharge sleeve 24 is sufficiently wide to maintain communication of thermoplastic melt through passageway 68 during radial re-positioning of sleeve 24. Other embodiments attempted to utilize constrictions downstream of the last laydown orifice to help reknit the layer of thermoplastic separated by spider legs 70, but the back pressure created in passageway 68 by the constriction was sufficient to interfere with radial adjustment of discharge sleeve 24. It should be appreciated, however, that the pressure drop in extrusion passage 68 across discharge sleeve 24 should be between about 400 and 600 psi to assist in the bonding together of the individual layers of the pipe. In addition, the diameter of constriction 138 should be such that a pressure drop of from about 400 to about 600 psi across constriction 138 is achieved. Generally, such a pressure drop across constriction 138 is achieved when forming pipe having diameters of from 2 to 6 inches, by limiting the total cross sectional area of extrusion passage 68 at constriction 138 to about one square inch. Generally, constriction 138 should be at least one inch in length at its narrowest point to ensure adequate rejoining of the thermoplastic melt.

By referring first to FIG. 2, the operation of the apparatus proceeds as follows: thermoplastic material is loaded into feed hopper 33 of main extruder 32 and formed into a melt state therein. The main extruder 32 and coextruder 40 may each be a screw extruder or rotary extruder of a design which is familiar to those persons skilled in the art. The apparatus described herein can be employed to produce a multiple layered pipe with a wide range of thermoplastic materials, including all extrudable plastic materials. Examples of such materials include cellulose esters and ethers such as ethyl cellulose acetate, vinyl and vinylidene polymers and copolymers such as polymers and copolymers of vinyl chloride, vinyl acetate, vinylidene chloride, ethyl vinyl alcohol, polyvinyl alcohol; and polymers and copolymers of acrylic and methacrylic esters; polymers and copolymers of olefins, such as ethylene, propylene, and butylene; polymers and copolymers of styrene, 2-methyl styrene and their mixtures of elastomeric copolymers; polyamides; polycarbonates; polyaldehydes, polyethers; polyurethanes; polyesters; natural and synthetic elastomers; and silicon resins and elastomers and polyethylene terephthalate. Preferably, however, polyethylene terephthalate, ethylene vinyl alcohol, or the polystyrenes and their copolymers and elastomers are employed, such as polystyrene, styrene-acrylonitrile-copolymers (SAN), styrene-butadiene-acrylonitrile-copolymers (ABS), and methacrylate-styrene-rubber copolymers.

These plastic materials can, of course, be used in admixture with fillers, plasticizers, colorants, or other ordinary additives, provided they are in a state permitting melt extrusion.

In the preferred embodiment, moreover, these plastics are combined to take advantage of the desirable properties of each thermoplastic. By way of example of desirable properties, there may be mentioned mechanical strength, resistance to shock, thermal properties, transparency, opacity, resistance to chemicals, impermeability to liquids, gases, and odors, ease of working, ability to receive printing or decoration, etc. Particularly preferred according to the present invention is a three layered pipe having an outer layer of polyethylene terephthalate, an intermediate barrier film of ethyl vinyl alcohol, and an inner layer of polyethylene terephthalate.

After discharging from extruder 32 through line 34, the melt enters die body 20 through inlet 60. Referring now to FIG. 3, the thermoplastic melt then flows through inlet 60 where it subsequently impacts conical nose 72 of mandrel 66. A portion of the thermoplastic melt continues axially through restrictor orifice 86 and into axial passageway 76 through radial orifices 125 to annular reservoir chamber 124 of the second laydown body 98. The remaining melt impacts conical nose 72 and is axially pierced, radially separated, and directed through extrusion inlet passageway 74 into extrusion passageway 68. It should be appreciated that upon entering extrusion passageway 68, the melt will contact spiders 70 located therein causing the thermoplastic melt to separate as it flows around the spider legs 70. In other apparatus, the spider legs were positioned at a point early in the extrusion process before a multiple layered annular stream was formed. These apparatus provided a length of uninterrupted extrusion passageway after laydown of the multiple layers to allow the objectionable marks created by the spiders to be eliminated by the melt being reunited. Generally, the uninterrupted passageway was provided through use of a mandrel and surrounding sleeve of suitable length to allow the bonded layers of thermoplastic to stabilize before exiting the die body. It has been found that "reknitting" or rejoining a thermoplastic outer layer which is part of a multi-layered stream creates a certain lack of uniformity in the layer thickness. In the present invention, however, extrusion passageway 68 has been constricted subsequent to or downstream of spider legs 70, but prior to the laydown of the multiple layers. It has been found that through the use of constriction 138, that the reknitting of the thermoplastic melt and elimination of the objectionable spider marks is better accomplished prior to the formation of the multiple layers.

Working in combination with main extruder 32 is coextruder 40 depicted in FIG. 2, which receives thermoplastic material through feed hopper 41 and transforms it into a melt. The thermoplastic melt exits coextruder 40 through feed line 42 and control valve 44 into spider body 26.

Referring now to FIG. 3, die spider body 26 receives the thermoplastic melt through line 42 to a feed connector 109, having a passageway therein in direct communication with inlet passageway 108. The thermoplastic melt continues through passageway 108 into longitudinal feed passage 106 and into annular reservoir chamber 104. In annular reservoir chamber 104 the flow rate of thermoplastic melt is decreased and uniformly distributed about reservoir chamber 104 by the back pressure from feed equalizer ports 116 caused by the smaller diameter therein. It should be remembered that longitudinal feed passage 106 is oversized to allow an increased flow rate of thermoplastic material into reservoir chamber 104. Feed equalizer ports 116 are sized sufficiently narrow to create a back pressure or pressure differential thereacross. The decreased flow rate of thermoplastic through feed ports 116 provides a sufficient pressure differential or hydraulic balance therein to ensure complete distribution of thermoplastic material about the annulus of reservoir chamber 104. The melt is then uniformly distributed through feed ports 116 to annular feed chamber 112. From annular feed chamber 112 the thermoplastic melt flows outwardly through annular laydown orifice 118 into extrusion passageway 68. The use of feed equalizer ports 116 to equalize flow to the annular feed ring is further described in U.S. Pat. No. 4,249,875 incorporated herein by reference. As the melt from restrictor orifice 118 enters extrusion passageway 68 it is laid down on the inner surface of the stream of thermoplastic melt entering extrusion passageway 68 through feed passage 74 thereby forming a two layer thermoplastic flow comprising outer layer 19 and middle layer 18 of pipe 14 (FIG. 1).

Thermoplastic melt from main extruder 32 flows through constrictor orifice 86 and central feed passage 76 into annular reservoir chamber 124 of the second laydown body 98. The annular reservoir chamber 124 acts in a manner similar to annular reservoir chamber 104 to equalize and distribute the thermoplastic melt to feed equalizer ports 128. From feed equalizer ports 128 the thermoplastic melt flows axially to annular feed chamber 126 where it is radially distributed through annular laydown orifice 130 into extrusion passageway 68, where it lays down on the inner surface of the two layer thermoplastic melt flowing downstream therein to form inner layer 16 of pipe 14.

It should be appreciated that constriction 138 will create a low pressure area in extrusion passageway 68 due to the reduced area for flow of thermoplastic melt through the constriction. Due to the pressure imbalance therein the flow of melt through extrusion passage 68 will decrease resulting in a corresponding increase in the flow of thermoplastic through central passageway 76. In order to remedy the flow rate imbalance, a central feed passage restrictor 82 is placed in the mouth of bore 76 to equalize the flow rates in bore 76 and extrusion passageway 68. The diameter of constrictor orifice 86 will depend on several factors, including among others, the width of extrusion passageway 68, the diameter of bore 76, and the viscosity of the thermoplastic melt. Any final adjustments of restrictor orifice 86 will be based on trial and error by observing the layer thicknesses displayed and recorded by scanner 55. If, after observing the readings from the rotary scanner 55, it can be seen that the thickness of outer layer 19 is too small in relation to inner layer 16, a plug 84 having a smaller orifice should be substituted to increase reduce the flow in center passage 76. On the other hand, if outer layer 19 is too thick, then a plug 84 having a larger orifice is necessary. Additional adjustments in the thickness of outer layer 19, inner layer 16 or in the concentricity of pipe 14 may be performed by rotating adjusting bolts 61 to radially reposition sleeve 24 in the desired location.

Another significant aspect of the present invention is the laydown of inner layer 16 and outer layer 19 from a single main extruder by utilization of central passageway 76 through mandrel 66. It should be appreciated that when coextruding material onto a thin intermediate barrier film it is important that the relative viscosities of the film layer and outer/inner layers be compatible. Utilizing a single extruder to form both layers not only decreases the cost; it also allows a more uniform temperature to be maintained in the thermoplastic of outer layer 19 and inner layer 16. Uniform temperatures in layers 19 and 16 allow greater control over their relative viscosities to obtain better bonding and more uniform thickness of these layers. Such uniformity in temperature is not otherwise obtainable when utilizing separate extruders for each layer.

Figure 7:
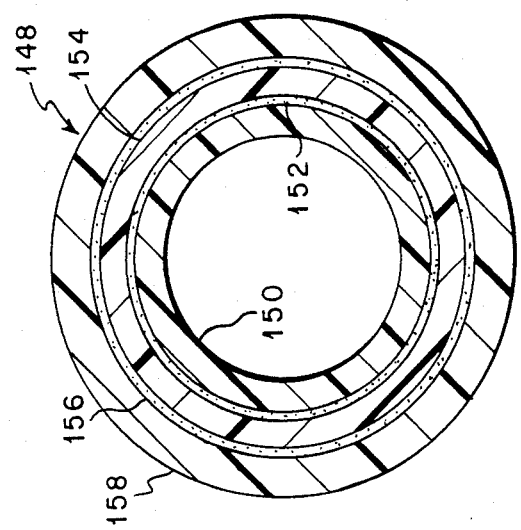
FIG. 7 is an axial sectional view of a five layer pipe.

In another embodiment of the present invention, a five layer pipe is formed as illustrated in FIG. 7. The pipe indicated at 148 includes an inner layer 150 of a thermoplastic material, a second layer 152 of a defined material such as adhesive, a center or barrier film layer 154 of thermoplastic, a fourth layer 156 of a defined material such as adhesive, and an outer layer 158 of thermoplastic. Layers 150 and 158 preferably have thicknesses greater than about 20 mils; barrier layer 154 will have a thickness from about 5 to about 10 mils; the thicknesses of each layer in FIG. 7 are not shown in proportion, however. It should be appreciated that in the five layer pipe, two layers of adhesive are necessary when outer layer 158 and film layer 154 are not capable of being directly bonded to one another during coextrusion, whereas in the three layer embodiment illustrated in FIG. 1 no adhesive was necessary since the outer, center and inner layers were made of thermoplastic capable of being bonded by coextrusion. A five layer pipe having five layers of compatible thermoplastic material joined without the use of adhesive is also contemplated by the present invention.

Materials useful in the formation of the pipe in this embodiment have been described previously. Adhesives useful in the present invention include those commercial products designed for bonding of polymer layers.

In one preferred embodiment outer layer 158 and inner layer 150 are polyethylene terephthalate, the barrier film layer 154 is ethylene vinyl alcohol, and the adhesive layers 152, 156 are DuPont CXA 136. In another preferred embodiment, outer layer 158 is polyethylene terephthalate, the film layer 154 is polystyrene and the adhesive layers are DuPont 1123.

Figure 8:
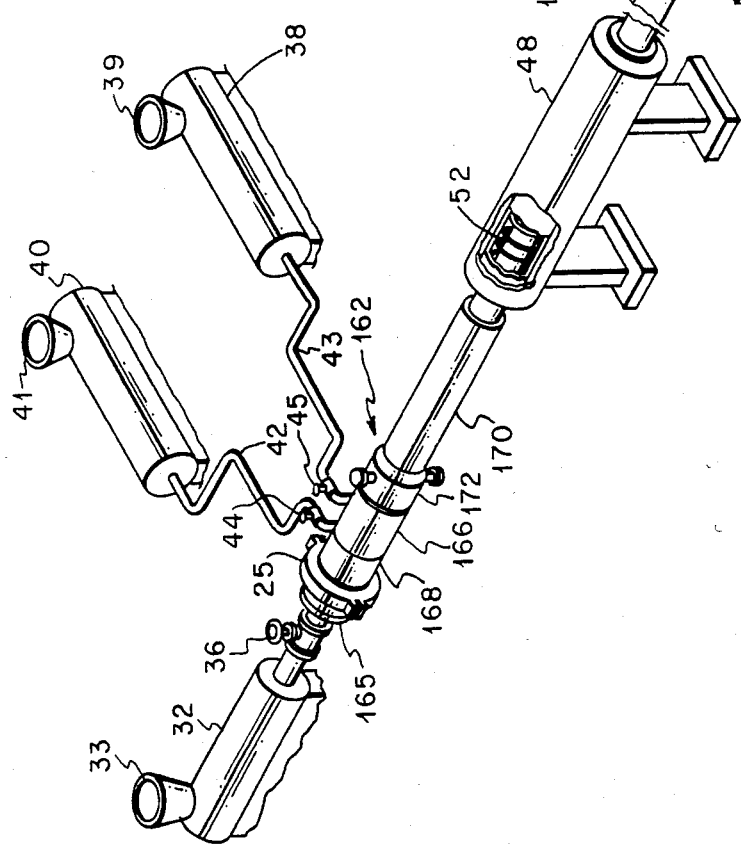
FIG. 8 is a perspective view of another embodiment of the present invention showing the attachment of the main extruder, coextruder, vacuum sizer, pipe pulling means and rotary scanner in relation to a die apparatus adapted for the formation of the five layer pipe.

The apparatus used to form the five layer thermoplastic pipe is illustrated in FIG. 8. The apparatus shown in FIG. 8 is similar to that shown in FIG. 1 except that in FIG. 8 die apparatus 20 is replaced by a larger die apparatus indicated at 162 and having additional laydown means therein. Die apparatus 162 includes a die transition body 165 at the left end thereof and a die discharge sleeve 170 at the right end thereof. Interposed between die bodies 165 and 170 are die inlet body 168, spider body 166, and a discharge sleeve adjustment body 172. In addition, a second coextruder 38 having a feed line 43 and control valve 45 is connected to with spider body 166. In this embodiment, coextruder 38 contains adhesive material which is fed therein through hopper 39.

Figure 9:
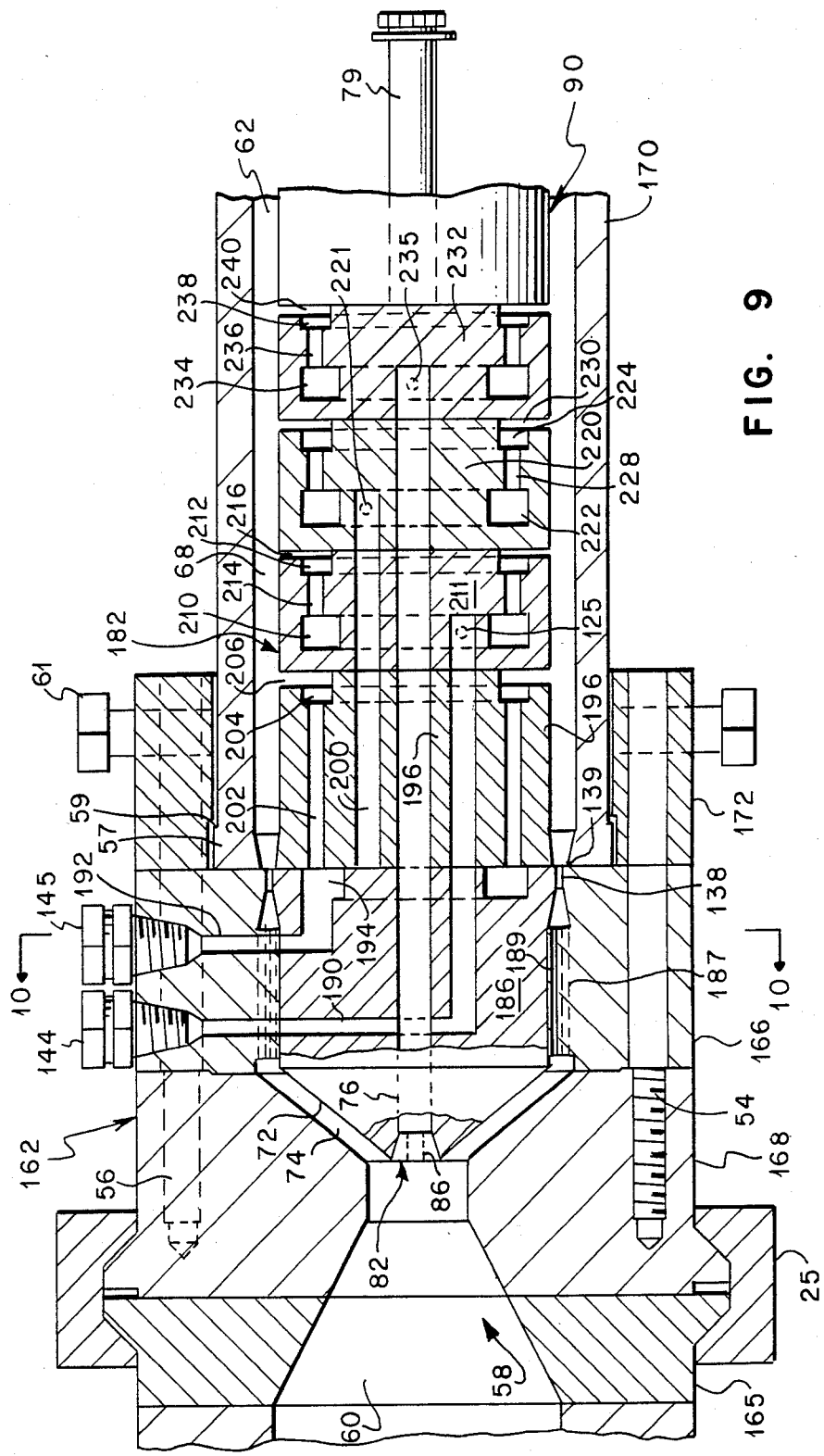
FIG. 9 is a longitudinal section through the die apparatus taken along line 9—9 of FIG. 8.
Figure 10:
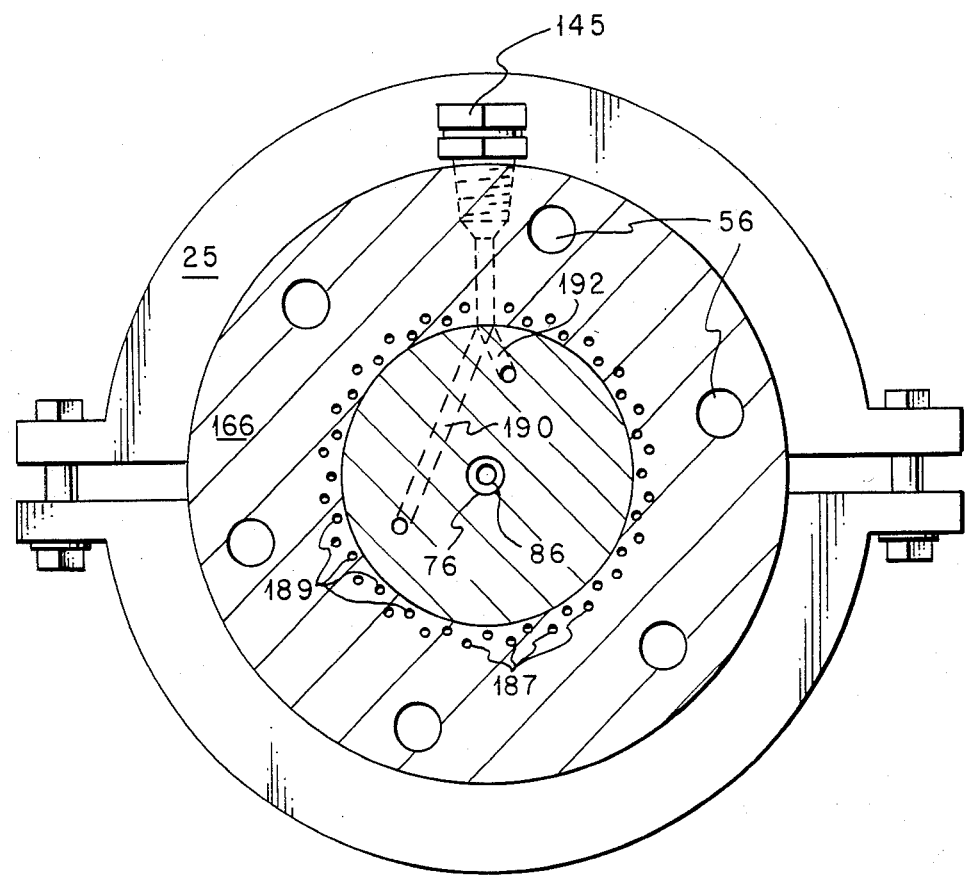
FIG. 10 is an axial sectional view through the spider body and spider section taken along line 10—10 of FIG. 9.

As can be seen from FIGS. 9 and 10, a mandrel 182 is supported in bore 58 by spider body 166 at mandrel spider section 186. Spider mandrel section 186 includes a plurality of outer longitudinal passageways 187 and a plurality of inner longitudinal passageways 189 radially offset therefrom. Passageways 187, 189 are concentrically located about bore 58 in communication with passageway 68 and inlet 74 for the passage of thermoplastic material therethrough. By utilizing spider section 186, mandrel 182 is held in place about its entire circumference to provide greater support within bore 58. Also included in mandrel spider section 186 is the continuation of axial bore 76, and a feed passage 190 beginning at feed connector 144 at the outer surface of spider die body 166, traversing vertically through spider body 166 and continuing first vertically, then axially through spider section 186. A second distribution passageway 192, begins at feed connector 145 located at the surface of spider body 166 and vertically passes through spider body 166 to communicate with an annular reservoir chamber 194 milled into the right end surface of spider section 186. Annular reservoir chamber 194 is further defined by the left end face of first laydown section 196. Feed passageways 190, 192 are in direct communication with feed conduits 42, 43 respectively through feed connectors 144, 145 respectively.

Adjacent to and downstream of spider section 186 is first laydown section 196 including therein a continuation of central feed passage 76, a continuation of feed passage 190, a feed passage 200 in communication with annular reservoir chamber 194, and feed equalizer ports 202 which communicate with annular feed rings 204 and annular chamber 194. Annular distribution or "laydown" orifice 206 is in direct communication with extrusion passageway 68 and annular feed ring 204 for laydown of outer adhesive layer 156 onto outer thermoplastic layer 158 coming from main extruder 32. In this embodiment adhesive is introduced into passageway 68 through annular laydown orifice 206, however thermoplastic may be substituted therefor when adhesive bonding is not necessary between layers. It should be appreciated that passages 190 and 192 must be radially offset from central passage 76. All passages are shown lying in the plane of FIG. 9 for purposes of convenience however.

Returning now to FIG. 9, second laydown section 211 adjacent to and downstream of first laydown section 196 includes a continuation of central feed passage 76 and a continuation of passageway 200. Also included therein is feed passage 190 which communicates with annular reservoir chamber 210 through radial distribution ports 125. Reservoir chamber 210 communicates with annular feed ring 212 through feed equalizer ports 214. Annular feed ring 212 is in direct communication with extrusion passageway 68 through annular laydown orifice 216 to provide a tubular stream of thermoplastic material forming the film barrier layer 154.

Downstream and adjacent to second laydown section 211 is third laydown section 220. Third laydown section 220 includes a continuation of axial feed passage 76, and an annular reservoir chamber 222 in communication with feed passage 200 through radial distribution ports 221. Annular feed ring 224 communicates with annular reservoir chamber 222 through feed equalizer ports 228. Annular laydown orifice 230 in communication with annular feed chamber 224 and extrusion passageway 68 provides a tubular laydown of the stream comprising adhesive layer 152.

Adjacent and downstream of third laydown section 220 is fourth laydown section 232 which includes therein annular reservoir chamber 234, radial distribution ports 235, feed equalizer ports 236, annular feed chamber 238 and annular laydown orifice 240 which are in communication with central passageway 76 to provide the laydown of the stream comprising innermost thermoplastic layer 150.

Although several specific preferred embodiments of the present invention have been described in the detailed description above, this description is not intended to limit the invention to the particular form or embodiments disclosed herein since they are to be recognized as illustrative rather than limitative, and it will be obvious to those skilled in the art that the invention is not so limited. For example, even though an apparatus has been described showing the laydown of three or five layer pipe, it should be appreciated that a seven or more layer pipe may be formed by the use of additional laydown means. Thus, the invention is declared to cover all changes and modifications of the specific examples of the invention herein disclosed for purposes of illustration which do not constitute departures from the spirit and scope of the invention.

The embodiments of the invention in which an exclusive property or privilege is claimed is defined as follows:

1. A balanced flow die apparatus for producing multilayer thermoplastic pipe, the apparatus comprising:
   a hollow die body having a bore extending therethrough;
   a mandrel located in the bore in said die body forming an annular extrusion passageway with said body and having a coextrusion passageway extending therethrough, said extrusion and coextrusion passageways having a common inlet for receiving a first thermoplastic material and having a common outlet;
   spider means extending across said extrusion passageway locating said mandrel in said body;
   flow restriction means in said extrusion passageway downstream of said spider means for reuniting said thermoplastic material in said extrusion passageway that has been disrupted by said spider means;
   flow restriction means in said coextrusion passageway for balancing the flow rates in said extrusion and coextrusion passageways; and,
   passageway means in said body and mandrel forming an annular feed chamber and for carrying a second thermoplastic material to an annular radial orifice in said mandrel, said annular orifice being located downstream of said spider means and restriction means and connected to said extrusion passageway whereby said second thermoplastic material is interposed between said first thermoplastic material in said extrusion and coextrusion passageways to form a multilayer pipe having at least two thermoplastic materials located in concentric juxtaposition.

2. The die apparatus of claim 1 wherein the restriction in the coextrusion comprises a plug including a passageway therethrough, the plug being interchangeable with other plugs having different sized passageways.

3. The die apparatus of claim 1 additionally comprising at least one additional annular radial orifice positioned within the bore downstream of the first mentioned radial orifice and circumscribed by the main extrusion passageway for applying an additional layer of thermoplastic material to the inside surface of the thermoplastic material flowing thereover.

4. The die apparatus of claim 1 additionally comprising a pressure balanced reservoir in communication with each annular feed chamber for balancing the flow of the thermoplastic material about each annular radial orifice.

5. The die apparatus of claim 4 wherein the pressure balanced annular reservoir comprises an annular reservoir chamber having a plurality of selectively spaced feed equalizer ports connecting the annular reservoir chamber to the annular feed chamber.

6. The die apparatus of claim 1 wherein the restriction in the coextrusion passageway comprises a plug including a passageway therethrough, the plug being interchangeable with other plugs having different sized passageways.

7. The die apparatus of claim 1 additionally comprising:
an extruder for supplying the first thermoplastic material to the extrusion and coextrusion passageways, the extruder having means for regulating the flow of the first thermoplastic material to the extrusion and coextrusion passageways; and
a coextruder for supplying thermoplastic material to the radial orifice, the coextruder having means for regulating the flow of the second thermoplastic material to said radial orifice.

* * * * *